UNITED STATES PATENT OFFICE.

EDMOND L. M. BROCHON, OF MILAN, ITALY.

PROCESS FOR THE EXTRACTION OF GLYCERINE FROM THE RESIDUARY WATERS RESULTING FROM THE MANUFACTURE OF SOAPS.

SPECIFICATION forming part of Letters Patent No. 264,616, dated September 19, 1882.

Application filed June 24, 1882. (No specimens.)

*To all whom it may concern:*

Be it known that I, EDMOND LOUIS MARIE BROCHON, of Milan, Italy, have invented a Process for the Extraction of Glycerine from the Residuary Waters resulting from the Manufacture of Soaps; and I do hereby declare that the following is a full, clear, and exact description of the same.

The patent demanded by me consists in an "ensemble" of processes having for their object the extraction of the glycerine contained in the waters that result from the manufacture of soaps. This extraction presents difficulties. The waters resulting from the manufacture of soaps from fatty bodies from which the glycerine has not previously to their employ been extracted are very impure. In fact, besides glycerine, they contain chlorides, sulphates, carbonates of soda, and caustic soda, and sometimes salts of potash and soapy matters which have escaped during the operation of removing the superfluous water from the soap, as also fat acids, (oleic and others) gelatinous matters, resins, &c. First of all, then, these waters must be purified; but the purification not causing the salts to disappear, and not even diminishing them in quantity, it is further necessary to effect the separation of the glycerine from the said salts.

I will now describe the processes by which I effect these operations.

*Purification.*—The waters resulting from the manufacture of the soaps are transported to a special manufactory, and are stored up in reservoirs, and there chloride of sodium is added to them (the products of previous operations hereinafter described) in order to complete the operation of removing superfluous water. After the lapse of a time sufficiently prolonged to allow of the separation of all the soapy matters, the clear liquid is removed either by means of decanting or by filtration. This liquid is afterward rendered acid by means of hydrochloric acid or sulphuric acid in order to effect the separation of the fat acids from the bases with which they are at present combined, (and therefore it is necessary to admit a small excess of acid,) and then the part become insoluble may be precipitated either by means of albumen, gelatine, or perchloride of iron, chloride of alumine, chloride of zinc, sulphate of iron, sulphate of alumine, and generally by any of the agents capable of producing the effect of coagulation, in order to obtain the desired result, notably by all the chlorides or the soluble metallic sulphates. With regard to the quantities, they depend upon the degree of purity of the liquid. These reagents, albumen, gelatine, metallic salts, &c., produce a real clarification, producing the same effects as the fining for the wines. All these operations take place while the water is cold. The clear liquid removed after deposit or filtration has taken place can be immediately concentrated. It is, however, best to submit it to a final operation, either by heating it till ebullition takes place and by adding milk of lime or lime-wash until the mass is rendered alkaline and the metallic salts are precipitated. It is left for deposition to take place; and to the liquid, which is now exceedingly clear, bicarbonate of soda or potash, or even carbonate, is added, but only in the quantities rigorously necessary for the precipitation of the lime; and, lastly, after having freshly taken the clear liquid, now quite free from lime, it is neutralized by hydrochloric acid.

*Concentration of the glycerine and separation of the salts.*—In the liquids prepared in the manner just described, which now contain only the glycerine and the salts, the separation of the glycerine from the salts and the concentration of the first are effected at the same time. This double work—that is to say, the separation of the salts and the simultaneous concentration of the glycerine by the process of my invention—can be effected with any form of vessels and by adopting any convenient plan for heating the evaporating apparatuses. However, to render my invention more clear, I will here describe as a specimen the very simple case in which the apparatus is heated in an ordinary furnace to a sufficient temperature for effecting the necessary concentrations. I will take, then, as an example of an apparatus that would effect the process I have invented, a collection of metal boilers—let us say twelve in number. These boilers, which may vary in dimensions, (and even in number,) according to the quantity of liquid that it is required to treat and the heating-power of the fuel employed, are all cylindrical, and they are by preference heated laterally, for, especially in the case where they have to sustain the action of the gases arising directly from a furnace, heating them at the end gives rise to the ready production of scaling—one of the least inconveniences of which is to compromise the wear of the apparatus. These boilers have their bottoms and about fifteen per cent. of their height below the flues, and these same flues do not rise to about seventy per cent. of their height, which leaves about thirty per cent. of the boiler above them, and this, with the fifteen per cent. below, leaves only about fifty-five per cent. of intermediary part for the flues to act upon. These boilers are put in operation by filling them all to above the level of the flues with purified glycerine liquids, as above described, and in proportion as evaporation causes the level of the liquid to be lowered I am careful to furnish a fresh supply, and this by employing the system that I am now going to explain. Supposing that the number of boilers be twelve, (a number that may be reduced to even as much as a half, or, on the other hand, that it may be necessary to increase,) I feed the boiler No. 12 with liquid taken directly from No. 11, No. 11 with liquid taken directly from No. 10, and so on, till I arrive at No. 1, which I furnish with a supply of fresh liquid. The evident result from this is that the liquid in No. 12 is very quickly more concentrated than all the others, and that that in the No. 11 is more so than that in the No. 10, &c., until I arrive at the No. 1, which is naturally less concentrated than all, and, in fact, very little more concentrated than the fresh liquid. The liquid No. 12 quickly reaches saturation, and the salts contained in it begin to deposit at the lower and non-heated part of the boiler, and the case is successively the same for the No. 11, the No. 10, &c. As soon as the deposit commences to form in No. 12 I remove it in any convenient way — by a ladle, for example — and after having lightly drained it in such a way that the liquid draining from it falls back into the boiler 12, I place it in the No. 11. I do the same in the case of the No. 11, and for all those preceding, ladling the precipitated salts from one boiler and placing them in the next, and this, no matter whether the precipitated salts arise from concentration in the apparatus itself from which I am ladling, or whether they are the results of concentration in any of the preceding apparatuses. When at last the deposit of salts begins to take place, even in the No. 1, I remove all the salts from it, and, after submitting them to a good draining, place them in store; notwithstanding, if the initial liquid still possesses a proportion of glycerine sufficient to make it worth while, I submit it to a final washing in pure water saturated with salt; but this is nearly always an unnecessary precaution, for the liquid in the first boiler will be found nearly always to be almost fluid, and the little glycerine that remains mixed with the salt is poor enough to be neglected. When the boiling-point in the No. 12 boiler reaches 120° centigrade the liquid is removed from it and placed in a state of repose, in order to allow the deposit of salts to thoroughly take place, and then the concentration of it is pushed until the boiling liquid marks 150° centigrade in boilers that are special, but which are arranged like those previously described with regard to the heating of them. The salts are removed from these boilers in proportion according as their production takes place. This temperature of 150° centigrade obtained, the concentrated liquid is left to precipitate its salts, and then the clear part is removed in order to be sent to the distillery, and the bottom, composed of salts impregnated with glycerine, is returned to the boiler No. 12. The final elimination of salts must be obtained by means of distillation. The distillation can be effected in the ordinary way, with the exception of the precautions exacted by the presence of a small quantity of salts, (lateral heating, &c.)

It is evident that the concentration of liquids as above described could be effected quite as well in vessels of any other form, and heated in any other way than by the manner that I have just described—such as, for example, the employment of steam under or not under pressure, the passage of heated gases through the body of the liquid, or the drying action of the atmosphere, or by means of forming a vacuum, &c. All that is required, in fact, is that the operation of the liquids be conducted in the inverse sense to that in which the operation of the salts is conducted, the first enriching themselves with glycerine and proportionately impoverishing themselves of salt, and the second impoverishing themselves of glycerine in proportion as they progress.

Having thus described all that is necessary to a full understanding of my invention, what I claim as new is—

1. A process for extracting glycerine and salts from waters obtained in the manufacture of soap, which consists, first, in treating the cold waters with chloride of sodium, filtering, applying hydrochloric or sulphuric acid, and precipitating the insoluble matter with any of the well-known coagulating agents, next heating to ebullition the clear liquid and adding milk of lime, then treating with bicarbonate of soda or potash, and applying hydrochloric acid, as described.

2. A process of separating the glycerine and salts, which consists in feeding the liquid containing the glycerine and salts to successive boilers, then draining and transferring the precipitated salts back through the series of boilers and removing the precipitated salts, then heating the liquid to 150° centigrade and removing the precipitated salts, and finally distilling the liquid in the usual way, as described.

EDMOND LOUIS MARIE BROCHON.

Witnesses:
E. P. MacLean,
G. Coquet.